Dec. 29, 1964 E. A. HENNINGSEN 3,163,336
END GATE CLOSURE MECHANISM FOR A MATERIAL UNLOADER
Filed Dec. 3, 1962 2 Sheets-Sheet 1

INVENTOR.
E. A. HENNINGSEN
BY William A. Murray
ATTORNEY

INVENTOR.
E. A. HENNINGSEN
BY William A. Murray
ATTORNEY

United States Patent Office 3,163,336
Patented Dec. 29, 1964

3,163,336
END GATE CLOSURE MECHANISM FOR A
MATERIAL UNLOADER
Etlar A. Henningsen, Geneseo, Ill., assignor to Deere &
Company, Moline, Ill., a corporation of Delaware
Filed Dec. 3, 1962, Ser. No. 242,020
5 Claims. (Cl. 222—505)

This invention relates to a manure spreader and more particularly relates to the gate assembly that closes the open rear end of the spreader. Still more particularly this invention relates to the latch mechanism and the means of effecting closure of the gate.

In a pending application filed July 3, 1961, Ser. No. 121,682 there is shown and described an endgate used in conjunction with a manure spreader. The endgate there shown and described is mounted on the side walls of the spreader box rearwardly of the rear edge of the floor. The weight is such and its pivotal connections are such that unless otherwise restricted the gate will gravitate into an open position i.e. one in which the lower forward edge of the gate is considerably rearward of the rear edge of the floor. The present invention relates to the means of latching the gate in its closed position as well as the means for releasing the latch from a remote spot such as the operator's station on the tractor. Therefore, it is the primary object of the invention to provide a new and novel latch mechanism used in combination with the rear gate on a manure spreader. Complementary to the main object is an additional object of providing means remote from the spreader for closing the gate.

Specifically, it is an object of the invention to provide a latch mechanism which utilizes a part in contact with a part of the gate in both its open and closed position. The latch is biased to its latched position relative to the gate. Upon the gate moving from its open to is closed position, the part of the gate contacting the latch will force open the slatch sufficient for the gate to close whereupon the biasing effect on the latch will lock the gate in its closed positions. The latch is manually controlled for releasing by a flexible element or cable extending forwardly of the box. The latch may be released from forward of the spreader whereupon the gravitational effect of the gate will cause the gate to open.

It is proposed in the present invention to have a tubular upper edge around the box. The flexible cable will extend within the tubular edge and will have a forward end extending outwardly from the front tubular edge of the box.

It is a further object of the present invention to provide a second flexible element connected to the gate itself that extends forwardly of the spreader so that an operator on a tractor may close the gate without leaving the tractor seat.

Other objects and advantages of the present invention will become apparent to those skilled in the art as the nature of the invention is better understood from the following description and as shown in the accompanying drawings.

Figure 1:
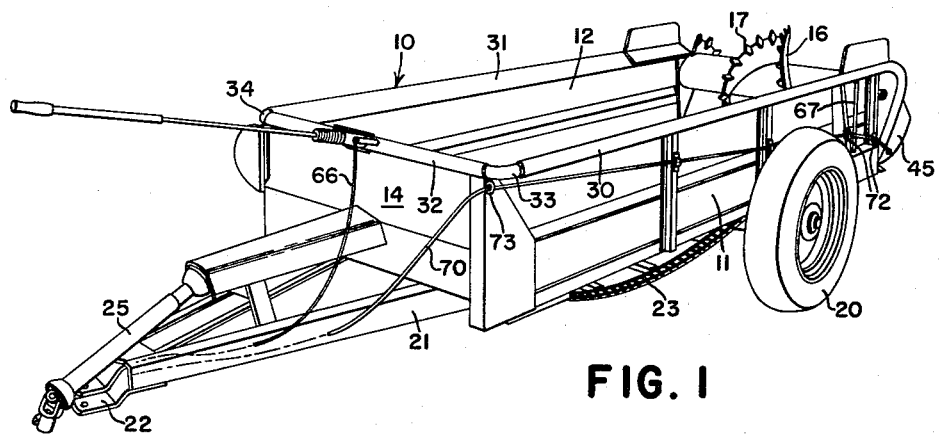
FIG. 1 is a front and side perspective of the entire manure spreader.

Referring now to the figures, there is provided a mobile fore-and-aft extending container or box 10 having oppositely disposed fore-and-aft extending side walls 11, 12 interconnected at their lower edges by a floor 13 and at the front by an upright transverse wall 14. The rear end of the container or box 10 is left open to provide a material discharge outlet. Disposed across the open rear end is a combination beater-widespread 15 contacting material feeding rearwardly and dispatching the material both laterally outwardly and rearwardly of the container 10. Details of the widespread are unimportant and the widespread may be described generally as having a flight means 16 with teeth 17 adjacent the outer edge of the flight means which contact, beat, and separate the material as the material comes in contact with them. The widespread 15 is carried on a transverse drive shaft 18 carried at opposite ends on the respective side walls 11, 12. The floor 13 terminates at a rear transverse edge having a rubber seal or flap 19 thereon. The seal 19 operates in conjunction with a gate, later to be explained, and generally seals material, and particularly liquid materials from draining out the rear end of the box.

The container 10 is supported at its rear by a pair of transversely spaced supporting wheels, one of which is shown at 20, and at its forward end by a rigidly forwardly projecting tongue or connecting structure 21 which may be attached to the drawbar of a tractor by a pivot or clevis type connection shown only partially at 22. Advancing means in the form of a floor conveyor, shown in its entirety by the reference numeral 23, has an upper run positioned inside of the box which operates to move material from front to rear over the floor 13. The conveyor is of conventional type having a pair of transversely spaced chains interconnected by flights that engage the undersurface of the material. The chains of the conveyor are carried on sprockets, one of which is shown at 24, at the rear and front of the container. Details of the drive mechanism for the conveyor 23 and widespread 15 are shown and described in U.S. Patent 3,014,729 that issued to Mr. E. A. Henningsen and A. E. Klouda December 26, 1961. If details of the drive mechanism are desired, such may be had by reference to that patent. Power for driving the entire conveyor and widespread mechanism is received from the power take-off shaft of a tractor, not shown, through a drive shaft 25 at the forward end of the spreader.

The upper edges 30, 31 of the respective sides 11, 12 are rolled into tubular elements. The upper edge 32 of the front wall 14 is also tubular in shape and is interconnected to the tubular edges 30, 31 by hollow corner sections 33, 34 respectively. The tubular edges 30, 31 and 32 not only serve as structural portions of the spreader sides, but also serve as a means through which control elements, later to be explained, may pass.

Figure 2:
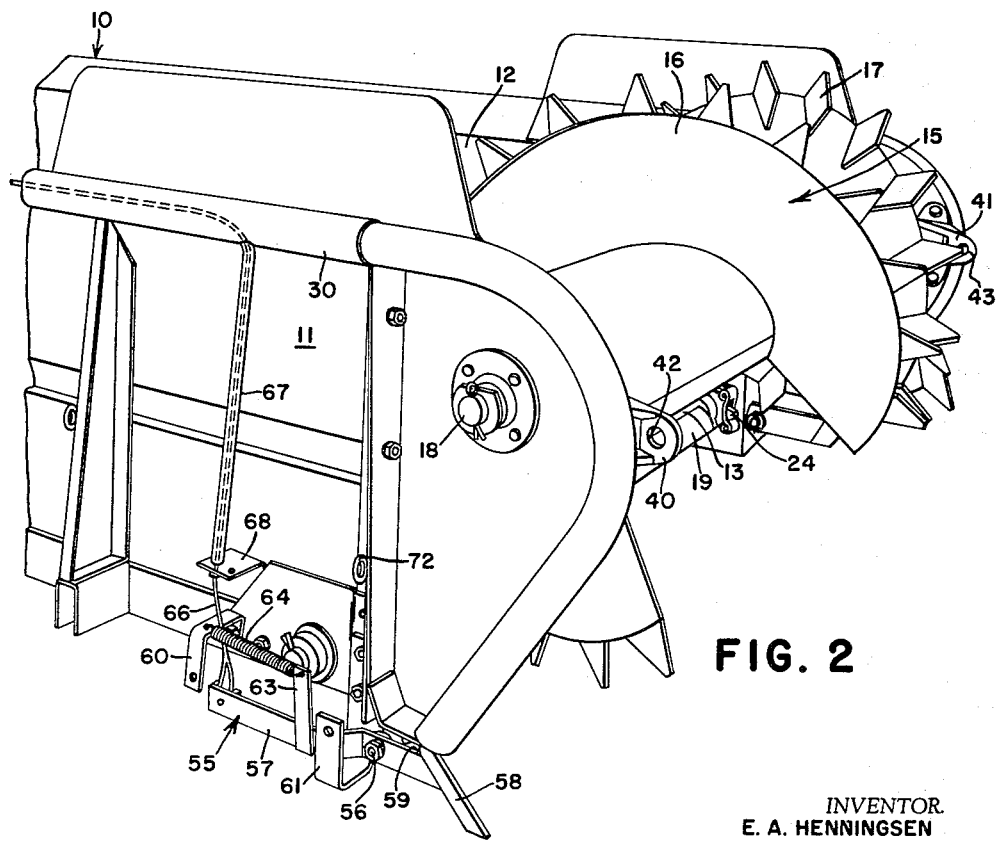
FIG. 2 is a rear and side perspective view of the spreader with the endgate removed and portions of housing structure removed so that the latch mechanism is clearly visible.

As may be seen in FIG. 2, there is provided on the rear upright edge of the side walls 11, 12 a pair of rearwardly projecting brackets 40, 41 having transversely alined openings 42, 43. The pivot openings 42, 43 are rearwardly and above the rear terminal edge, as defined by the transverse rubber seal 19, of the floor. Supported on the brackets 40, 41 and adapted to swing in the pivot openings 42, 43 is an endgate 44 having a pair of upright end panels 45, 46 defining generally rearward continuations of the respective side walls 11, 12, and an arcuate shaped transverse panel 47 interconnecting the rearward edges of the side panels 45, 46. The transverse panel 47 is generally inclined from its lower edge 48 (FIG. 3) adjacent the rear edge 19 of the floor to its upper rear edge 49, the latter being positioned rearwardly of the widespread 15. The weight of the gate 44 is such that the gate will swing to an open position, i.e. one in which the forward edge 48 is spacedly rearward of the rear edge 19 of the floor. This necessitates the use of external force for moving the gate into a closed position, i.e. one in which the forward lower edge 48 of the gate is in contact with the seal 19 on the rear edge of the floor 13. The entire gate structure 44 is pivotally mounted on the respective brackets 40, 41 by means of pivot bolts, one of which is shown at 50.

Figure 3:
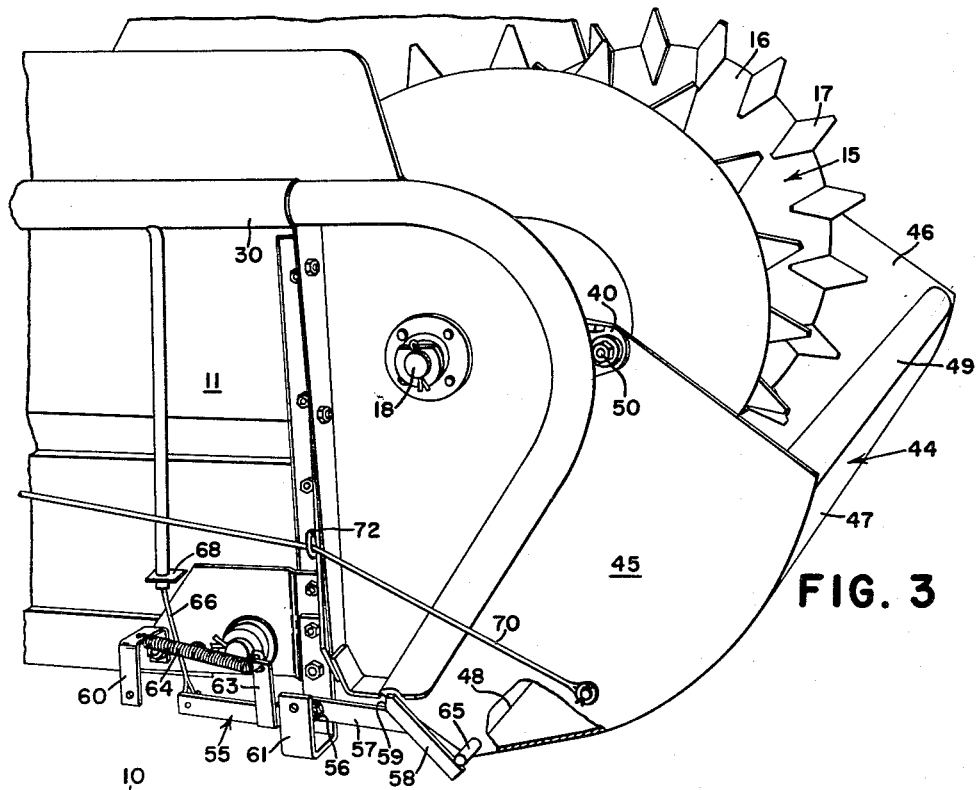
FIG. 3 is a view somewhat similar to FIG. 2 showing the gate mounted on the spreader and in its open position.

A latch element 55 is pivotally mounted at 56 to the side wall 11 adjacent its lower rear edge. The element 55 is composed of a forward horizontal portion 57 and an inclined rear portion 58 extending downwardly and rearwardly from the forward portion 57. The portion 58 projects upwardly from the upper edge of the forward portion 57 to define a hook or shoulder 59. Fixed to the side 11 is a pair of U-shaped supporting brackets 60, 61 on which is mounted a housing 62 (FIG. 4) covering the latching device. Extending upwardly and rigid with the forward portion 57 of the latch element 55 is an upright arm 63. A spring 64 extends between the bracket 60 and the arm 63 and normally biases the latch in a counterclockwise direction as shown in FIGS. 2 and 3.

Figure 4:
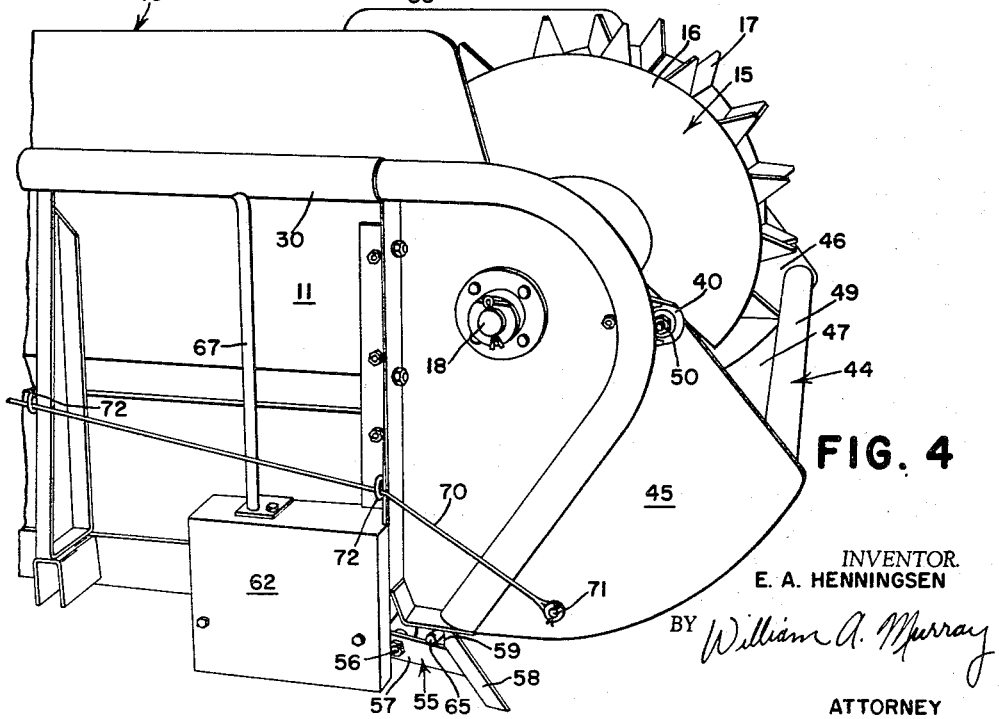
FIG. 4 is a view somewhat similar to FIGS. 2 and 3 showing the gate in its closed position and the housing structure over most of the latch device.

An abutment lug 65 extends outwardly from the face of the side panel 45. The lug 65 remains in contact with the upper edge of the inclined portion 58 of the latch element 55 when the gate 47 is in its open position as shown in FIG. 3. When in the closed position, as shown in FIG. 4, the lug 65 seats behind the shoulder 59 of the latch element 55. When the gate 44 is moved from its open to its closed position, the lug 65 will ride against the upper edge of the inclined portion 58 until it reaches the shoulder 59 whereupon the spring 64 will cause the latch element to snap behind the lug 65. The latch element 55 will thereupon lock the gate 44 in its closed position.

Release of the latch element 55 is effected by means of a flexible element or cable 66 connected to the forward end of the latch element 55 and extending through a vertical tube 67, the latter being fixed at its upper end to the tubular upper edge 30 and at its lower end to the side 11 by means of a bracket 68. The cable 66 extends through the upper tubular edge 30 of the side 11, the corner 33, and the front tubular edge 32 and terminates forwardly, as shown in FIG. 1, of the entire spreader box. While not shown, the cable 66 may be connected to a portion of the tractor and in a location convenient for the operator of a tractor. By pulling on the cable 66, the latch element 55 is moved in a clockwise direction so that the shoulder 59 is moved from behind the abutment lug 65. The gate 44 will then gravitate to its open position.

A second flexible element or cable 70 is connected to a lug 71 on the outer face of the gate panel 45. The cable 70 extends through eyelets such as at 72, 73 at the rear and front of the spreader box side to a forward terminal end forwardly of the box 10. The latter cable connection is generally optional since in some instances it will be desirable to permit the gate to open only for purposes of cleanout at the end of the spreading operation. However, if desired, the cable 70 may be attached and the gate opened and closed as desired and from a position remote from the spreader.

The entire gate assembly has particular advantage when used with a liquid type manure. In some instances upon reaching the field, it is desirable to permit the liquid to flow out of the box and at that time the gate 44 may be opened. Also, at the end of the spreading operation there will be retained a certain amount of material on the floor of the box. If the gate 44 were retained shut, the clearance between the arcuate portion 47 and the end of the teeth would be such as to permit the material to be retained in the box. Consequently to remove the last particles of the material it is often necessary to move the gate 44 into its open position so that the floor conveyor can move the material off of the rear edge of the floor.

While only one form of the invention has been shown, it should be recognized that other forms and variations will occur to those skilled in the art. Therefore, while the present disclosure is in concised and detailed form, it should be recognized that such is for the purpose of clearly and concisely illustrating the principles of the invention and there is no intention to limit or narrow the invention beyond the broad concepts set forth in the appended claims.

What is claimed is:

1. A gate assembly for use on the rear open end of a manure spreader, the spreader having a material carrying box with a front and opposed upright sides interconnected by a floor with a transverse edge at the rear open end, the box further having a continuous tubular edge along its front and sides, the assembly comprising: alined transverse pivots on the sides above and rearwardly of the rear edge; a gate having a latch engaging part thereon and opposed vertical side panels mounted on the pivots interconnected by a laterally extending panel inclined from a front edge adjacent the rear edge of the floor to an upper rear edge, the gate being adapted to swing on the pivots between a closed position in which the gap between the floor edge and front edge of the laterally extending panel is substantially closed and an open position in which the gap is relatively large to permit discharge of material therethrough, and the specific center of gravity of the gate being so located that the gate will gravitate from its closed to its open position; a fore-and-aft extending latch element pivotally mounted for vertical movement on the box and having a portion thereon adapted to seat in a latching position behind the latch engaging part on the gate when the latter is in its closed position, the latch element further having an inclined portion leading rearwardly from the aforesaid portion for engaging the aforesaid part on the gate as the latter approaches its closed position; means between the latch element and box biasing the element toward its latching position; a first flexible element connected to the latch element and extending within the tubular edge to a terminal end forwardly of the box and for releasing the latch from its latched position; and a second flexible element extending from the gate to the front of the box for effecting closure of the gate.

2. A gate assembly for use on the rear open end of a manure spreader, the spreader having a material carrying box with a front and opposed upright sides interconnected by a floor with a transverse edge at the rear open end, the assembly comprising: alined transverse pivots on the sides above and rearwardly of the rear edge; a gate having a latch engaging part thereon and opposed vertical side panels mounted on the pivots interconnected by a laterally extending panel inclined from a front edge adjacent the rear edge of the floor to an upper rear edge, the gate being adapted to swing on the pivots between a closed position in which the gap between the floor edge and front edge of the laterally extending panel is substantially closed and an open position in which the gap is relatively large to permit discharge of material therethrough, and the specific center of gravity of the gate being so located that the gate will gravitate from its closed to its open position; a latch element pivotally mounted for vertical movement on the box and having a portion thereon adapted to seat in a latching position behind the latch engaging part on the gate when the latter is in its closed position, the latch element further having an inclined portion leading rearwardly from the aforesaid portion for engaging the gate as the latter approaches its closed position; means between the latch element and box biasing the element toward its latching position; a first flexible element connected to the latch element extending to a terminal end forwardly of the box and for releasing the latch from its latched position; and a second flexible element extending from the gate to the front of the box for effecting closure of the gate.

3. A gate assembly for use on the rear open end of a manure spreader, the spreader having a material carrying box with a front and opposed upright sides interconnected by a substantially level floor with a transverse edge at the rear open end, the assembly comprising: alined transverse pivots on the sides above and rearwardly of the rear edge; a transverse gate mounted on the pivots having a latch receiving part thereon and adapted to swing on the pivots between a closed position and an open position, and the specific center of gravity of the gate being so located that the gate will gravitate from its closed to its open position; a latch element pivotally mounted for vertical movement on the box and having a portion thereon adapted to seat in a latching position in respect to the latch receiving part on the gate when the latter is in its closed position, the latch element further having an inclined portion leading from the aforesaid portion for engaging the gate as the latter approaches its closed position; means between the latch element and box biasing the element toward its latching position; a first element connected to the latch element extending to a terminal end forwardly of the box for releasing the latch from its latched position; and a second element extending from the gate to the front of the box for effecting closure of the gate.

4. A gate assembly for use on the rear open end of a manure spreader, the spreader having a material carrying box with a front and opposed upright sides interconnected by a floor with a transverse edge at the rear open end, the invention comprising: alined transverse pivots on the sides above and rearwardly of the rear edge; a gate having opposed vertical side panels mounted on the pivots interconnected by a laterally extending panel inclined from a front edge adjacent the rear edge of the floor to an upper rear edge, the gate being adapted to swing on the pivots between a closed position in which the gap between the floor edge and front edge of the laterally extending panel is substantially closed and an open position in which the gap is relatively large to permit discharge of material therethrough, the specific center of gravity of the gate being so located that the gate will gravitate from its closed to its open position; an abutment on the gate; a fore-and-aft extending latch element pivotally mounted for vertical movement on the box and having a portion thereon adapted to seat in a latching position behind the abutment when the gate is in its closed position, the latch element further having an inclined portion leading rearwardly from the aforesaid portion for engaging the abutment as the gate approaches its closed position to effect vertical movement of the latch element; means between the latch element and box biasing the element toward its latching position; a latch control connected to the latch element and terminating forwardly of the box for releasing the latch from its latched position; and a gate control extending from the gate to the front of the box for effecting closure of the gate.

5. A gate assembly for use on the rear open end of a manure spreader, the spreader having a material carrying box with a front and opposed upright sides interconnected by a substantially level floor with a transverse edge at the rear open end, the invention comprising: alined transverse pivots on the sides above and rearwardly of the rear edge; a gate mounted on the pivots to swing by gravity between a closed position and an open position; an abutment on the gate; a latch element pivotally mounted for vertical movement on the box and having a portion thereon adapted to seat in a latching position behind the abutment when the gate is in its closed position, the latch element further having an inclined portion leading rearwardly from the aforesaid portion for engaging the abutment as the gate approaches its closed position to effect vertical movement of the latch element; means between the latch element and box biasing the element toward its latching position; a latch control connected to the latch element and terminating forwardly of the box for releasing the latch from its latched position; and a gate control extending from the gate to the front of the box for effecting closure of the gate.

References Cited in the file of this patent

UNITED STATES PATENTS

| | | |
|---|---|---|
| 1,097,395 | Cullen | May 19, 1914 |
| 1,512,227 | Lee et al. | Oct. 21, 1924 |
| 1,654,032 | Avery | Dec. 27, 1927 |
| 2,888,885 | Dorey | June 2, 1959 |